United States Patent
Foucault et al.

(10) Patent No.: US 10,433,155 B2
(45) Date of Patent: Oct. 1, 2019

(54) METHOD TO PARAMETERIZE A COMMUNICATION SERVICE PROVIDED BY A SERVER OF A SERVICE PROVIDER TO A USER'S COMMUNICATION MODULE VIA A PORTABLE DEVICE

(71) Applicant: ORANGE, Paris (FR)

(72) Inventors: Béatrice Foucault, Tregastel (FR); Emmanuel Le Huerou, Saint Quay Perros (FR)

(73) Assignee: Orange, Paris (FR)

( * ) Notice: Subject to any disclaimer, the term of this patent is extended or adjusted under 35 U.S.C. 154(b) by 8 days.

(21) Appl. No.: 14/939,501

(22) Filed: Nov. 12, 2015

(65) Prior Publication Data
US 2016/0142907 A1    May 19, 2016

(30) Foreign Application Priority Data
Nov. 14, 2014   (FR) ...................................... 14 61033

(51) Int. Cl.
*H04W 8/22*   (2009.01)
*H04L 12/58*  (2006.01)
*H04L 29/08*  (2006.01)
*H04W 88/06*  (2009.01)

(52) U.S. Cl.
CPC ............. *H04W 8/22* (2013.01); *H04L 51/043* (2013.01); *H04L 67/24* (2013.01); *H04W 88/06* (2013.01)

(58) Field of Classification Search
CPC ...................................................... H04W 8/22
See application file for complete search history.

(56) References Cited

U.S. PATENT DOCUMENTS

| 6,671,508 B1 | 12/2003 | Mitsuoka et al. |
| 2004/0254998 A1 | 12/2004 | Horvitz et al. |
| 2006/0015609 A1* | 1/2006 | Hagale ................... H04L 67/24 709/224 |

(Continued)

FOREIGN PATENT DOCUMENTS

KR         101440362 B1      9/2014

OTHER PUBLICATIONS

Bloom, Alan., "Rumoured Microsoft Smartwatch to integrate with Linc?" Downloaded from URL:http://discoverucc.com/lync-news/microsoft-smartwatch-with-lync/; Oct. 23, 2014; 2 pages.

(Continued)

*Primary Examiner* — Mazda Sabouri
(74) *Attorney, Agent, or Firm* — Knobbe, Martens, Olson & Bear, LLP

(57) ABSTRACT

One embodiment relates to a method to parameterize a communication service delivered by a server of a service provider to a communication module of a user, the communication service being configured in accordance with an availability status, comprising detecting a change in context of use of a portable device of said user separate from said communication module, determining a new availability status as a function of the detected change in context of use, and transmitting a message relating to the new availability status to the server of the service provider or the communication module so that the communication service is configured on the basis of the determined new availability status.

15 Claims, 2 Drawing Sheets

(56) References Cited

U.S. PATENT DOCUMENTS

Figure 1:
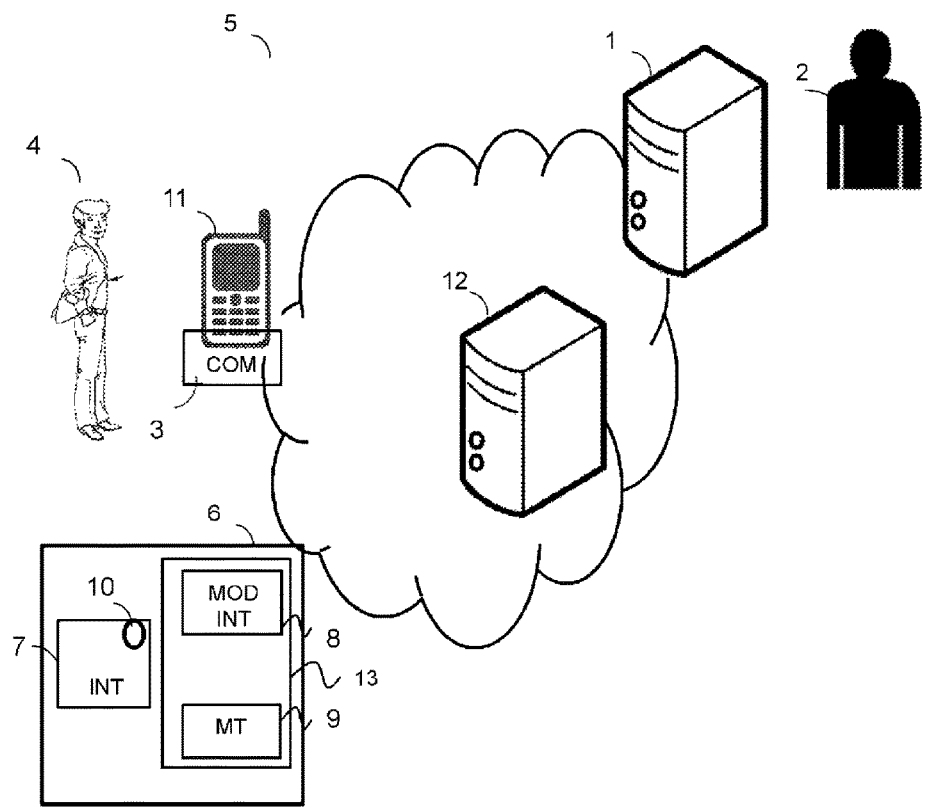

2008/0268816 A1* 10/2008 Wormald .............. H04W 68/00
455/412.2
2013/0217364 A1 8/2013 Varoglu et al.
2013/0346517 A1* 12/2013 Trent ...................... H04L 67/24
709/206
2014/0228054 A1* 8/2014 Rose ....................... G06F 3/048
455/456.3

OTHER PUBLICATIONS

Siewiorek et al., "SenSay: A Context-Aware Mobile Phone", Proceedings 7$^{th}$ IEEE Inter'l. Symposium, Los Alamitos, CA, USA; Oct. 21, 2003; pp. 248-249.
French Search Report dated Jul. 3, 2015 in corresponding French Application No. 1461033, filed Nov. 14, 2014; 4 pages.

* cited by examiner

METHOD TO PARAMETERIZE A COMMUNICATION SERVICE PROVIDED BY A SERVER OF A SERVICE PROVIDER TO A USER'S COMMUNICATION MODULE VIA A PORTABLE DEVICE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57 in their entireties. In particular, the disclosure of French Patent Application FR 1461033, filed Nov. 14, 2014 is incorporated herein by reference in its entirety.

GENERAL TECHNICAL FIELD

One embodiment relates to the taking into account of user availability by a communication service. It more particularly concerns a method for the parameterization of such a service via a portable device taking into account the availability status of the user in relation to user's context.

STATE OF THE ART

Numerous communication services such as messaging or videoconference services offer their users the possibility of indicating their availability so that the service is able to adapt itself accordingly. For example, the users of such a service may indicate to the service provider that they are unavailable and cannot receive calls or else that they can only receive messages.

Such a possible parameterization is nevertheless often ill-used by users. If the parameterizing of availability status requires manual action by the user, it is ascertained that numerous users consider the updating of such status to be a constraint and are therefore likely not to carry out such updating systematically when their availability undergoes change. There is therefore a risk that the current status of such users does not reflect their true availability. Some systems offer automatic environment-related detection of user availability but this is very often imperfect and also risks selecting an availability status that does not correspond to true user availability. There is therefore a risk that the communication service adopts unsuitable operation for the user since it is based on inaccurate availability status, and it may for example transmit calls to a user who does not wish to be disturbed.

In addition, such a situation in which the indicated availability status of a user is incorrect generally lasts a long time before user status is corrected. Existing devices providing such communication services do not allow rapid perception by the user that the selected availability status is incorrect. If the user no longer uses the device or uses the device for a function other than communication, the user's current status is no longer visible and the user is unable to realize that he or she has failed to update or that the automatic update has selected a wrong status. The wrong availability status then continues to last until the user again uses the communication service and turns attention to the updating of status or else changes environment sufficiently to trigger a new automatic detection.

There is therefore a need for a method to parameterize a communication service providing users with easy updating of their availability.

DISCLOSURE OF THE INVENTION

One aspect described herein relates to a method to parameterize a communication service delivered by a server of a service provider to a communication module of a user, the communication service being configured in accordance with availability status, comprising the following processes:

detecting a change in context of use of a portable device of said user that is separate from said communication module;

determining a new availability status as a function of the detected change in user's context;

transmitting a message relating to the new availability status to the server of the service provider or the communication module so that the communication service can be configured on the basis of the determined new availability status.

With such a method it is possible easily to update the availability status used to configure a communication service. Thus, the detection of a change in context of use of a user's portable device e.g. a watch triggers the configuration of the communication service delivered to a communication module of the user in relation to the user's new availability status. The parameterization method can be carried out by the portable device or by a terminal comprising the communication module.

According to one particular embodiment, the parameterization method further comprises a process to feed information back to the user on the determined new availability status via a user interface. Therefore the user is informed of the availability status being used to configure the communication service delivered to the user's communication module.

According to another particular embodiment, the detection of a change in context of use comprises a receiving process by the communication module of a message from the portable device containing information indicating a change in context of use of the portable device. According to this particular embodiment, the parameterization method is performed by a terminal comprising the communication module. The message containing information on a change in context of use of the portable device received by the communication module enables the terminal to determine a new availability status.

In a first variant of embodiment, the process to detect the change in context of use of the portable device comprises modification of the display mode of the information fed back by the portable device.

Therefore, when the portable device comprises selection components e.g. a button or mode dial or other, a manual command can be entered by the user by actuating the selection components for example by pressing on said button of the portable device or turning the mode dial.

When there is a change in user's context, the user is easily able to select a new context of use of the portable device.

In a second variant of embodiment, the process to detect a change in context of use of the portable device comprises automatic detection of the user's context.

The context of use of the portable device can therefore be updated in a manner adapted to the user's context without any action being required from the user.

The automatic detection process of the context may comprise a process to locate said portable device.

An adapted context of use of the portable device can therefore be selected in relation to the place (work, home . . . ) where the user is located.

The process for automatic detection of context may comprise a process to detect a communication device in said user's environment.

The user's context can therefore be inferred in relation to the proximity of a particular communicating item such as an access point of a specific network or an object on which an RFID tag has been affixed.

The message relating to the new availability status of said user can be transmitted to a context management server, said server of the service provider parameterizing said service via said context management server.

Such a context management server can therefore make available to the server of the service provider the current availability status of the communication service via which the user can be contacted by other users, or else can transmit more detailed parameterizing information thereto than mere availability status, without requiring any more action by the user.

With said user interface of the portable device displaying interface elements corresponding to a set of functionalities to be displayed, the process to feed information back on the new availability status of the user in the method according to the first aspect may comprise a selection of a set of functionalities to be displayed as a function of said new user's availability status and the display of interface elements corresponding to said set of selected functionalities.

The different services delivered to the user by the portable device via these functionalities can therefore be automatically adapted in relation to the user's context. Such an adaptation also allows easier realization by the user subsequent to a change in context that the current availability status of the communication service is no longer adapted to the user's context.

When all the functionalities to be displayed correspond to functionalities of the communication service, the user of the portable device is therefore informed of the functionalities available for the communication service delivered to the communication module. For example, when the new availability status corresponds to a status that cannot be reached by voice calls, one displayed interface element may correspond to a crossed-out telephone symbol indicating to the user that he/she will not receive any voice calls.

The method according to the first aspect may further comprise a process to parameterize said portable device or said communication module in relation to the new availability status of the user.

The user's context can therefore be locally taken into account at the portable device or the communication module, so that the latter can be parameterized independently of the communication service delivered by the server of the service provider.

A second aspect relates to a computer program product comprising code instructions to carry out a method according to the first aspect when the program is run on a computer.

A third aspect relates to a device to parameterize a communication service delivered by a server of a service provider to a communication module of a user, the communication service being configured in accordance with an availability status, comprising:

a data processing module capable of detecting a change in context of use of a portable device of said user that is separate from the communication module, and of determining a new availability status of a user as a function of the detected change in context of use;

an interface module capable of transmitting a message relating to the new availability status of said user to the server of the service provider or the communication module, so that the communication service is configured based on the determined new availability status of the user.

A fourth aspect relates to a portable device comprising a parameterizing device according to the third aspect and comprising a user interface to feed information back to said user on the new availability status.

A fifth aspect relates to a terminal comprising a parameterizing device according to the third aspect and a communication module.

Another embodiment relates to a system for parameterizing a communication service, comprising a portable device according to the fourth aspect, a communication module and a server of a service provider.

Such computer program product, parameterizing device, portable device, terminal and parameterizing system have the same advantages as those indicated for the method according to the first aspect.

PRESENTATION OF THE FIGURES

Figure 2:
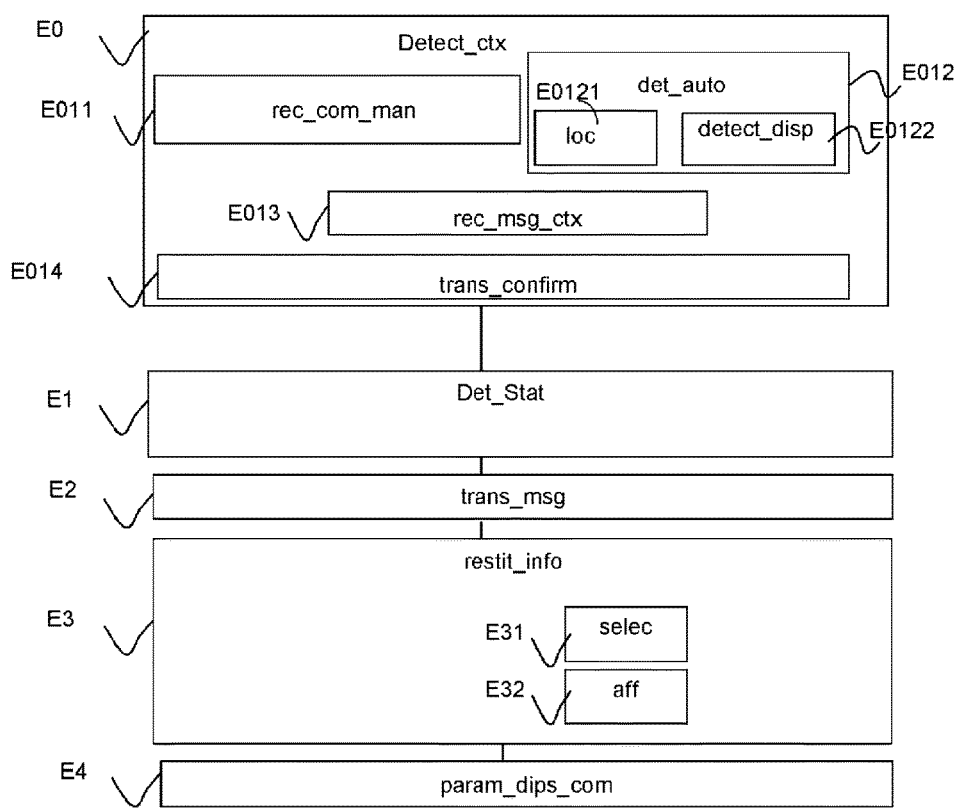

Other characteristics and advantages will become apparent on reading the following description of one embodiment. This description is given with reference to the appended drawings in which:

FIG. 1 schematically illustrates material devices for one possible embodiment;

FIG. 2 is a diagram schematizing a method to parameterize a communication service according to one embodiment.

DETAILED DESCRIPTION

With reference to FIG. 1, one embodiment concerns a method to parameterize a communication service delivered by a server 1 of a service provider 2 to a communication module 3 of a user 4 in a parameterizing system of a communication service 5, said service being configured in accordance with availability status.

The communication module 3 can be connected to the server 1 of the service provider so that it can receive the communication service and be connected to a portable device 6 held by said user.

The method proposes using a parameterizing device 13 for automatic configuration of the communication service delivered to the communication module in accordance with an availability status determined from a context of use of the portable device.

Such a parameterizing device 13 may comprise an interface module 8 of wire type such as an Ethernet or USB link, or of wireless type such as a Wi-Fi or Bluetooth connection, to connect said parameterizing device to the communication module or to the server of the service provider, and a data processing module 9 comprising a processor.

This parameterizing device may be included in a terminal 11 of the user or in the portable device 6.

Such a portable device may be a smartwatch or any other device held by the user comprising a user interface 7. Such a portable device may comprise an interface module of wire type such as an Ethernet or USB connection, or wireless such as Wi-Fi or Bluetooth to connect said portable device to the communication module or to the server of the service provider, and a data processing module comprising a processor. The user interface 7 of the portable device may comprise at least one button 10 to enable the user to interact with the portable device. This button may be a physical button such as a push-button or a virtual button displayed on a touch screen.

In one embodiment, such a portable device enables the user easily to change the availability status according to which the communication service is configured. In the event of change in user's context for example when the user changes from a context of "in a meeting" to "sports" the user changes the context of use of the portable device for example by changing the display of the screen of the portable device or by activating a heartbeat control function implemented by the portable device. Such a change in context of use of the portable device then allows modification of the availability status used to configure the communication service.

The portable nature of an object such as a watch further provides the advantage that it is consulted more often and more easily by the user than the terminals usually used to communicate via a communication service or to parameterize such a communication service such as a computer or mobile telephone. Users, by consulting said portable object, are therefore able to become aware of the coherency between their availability status and their current context. For example if the user's context corresponds to the fact that he/she is at a meeting, a corresponding availability status may indicate that the user accepts text messages and emails but not calls. Conversely, if the user's context corresponds to the fact that the user is practicing a sport and is wearing an earphone, a corresponding availability status may authorize calls and the delivery of vocal messages but not text messages since the user is not in a position to consult a screen. The origin of calls can also be restricted to a category of contacts e.g. the family.

The communication module may comprise an interface module of wire type such as an Ethernet or USB link and/or wireless type such as a Wi-Fi or Bluetooth connection, allowing it to connect to the server of the service provider and optionally to the portable device.

In one embodiment the communication module acts as relay between the parameterizing device and the server of the service provider to transmit information to the server 1 on the availability status of the user. The communication module and the parameterizing device are then connected via their interface modules.

In another embodiment the parameterizing device is in direct communication with the server of the service provider via its interface module, without involving action by the communication module. The communication module and the parameterizing device in this case are not necessarily directly connected.

The communication module 3 can be included in the user's terminal 11 separate from the portable device. Such a terminal may be a mobile telephone, smartphone, tablet, gaming console, desktop or laptop computer, PDA (Personal Digital Assistant) or any other terminal equipped with wired or wireless communication components allowing it to access the network to which the server of the service provider is connected. Such a network may then be the Internet network or mobile telephone network of GSM, GPRS, UMTS, LTE type . . . .

The server 1 of the service provider may have a RAM and storage components such as a non-volatile rewrite memory (flash memory or EEPROM memory) able to store a database and processing components comprising a processor. The server may also comprise interface components enabling it to connect to the communication module 3, these possibly being of wire type such as an Ethernet link, or wireless being of a Wi-Fi or Bluetooth connection.

The communication service delivered by said server of the service provider to said communication module may be any type of communication service such as a vocal call service, messaging service (email, SMS, MMS . . . ), chat or videoconferencing service.

A context management server 12 can also be connected to the communication module 3 or to the parameterizing device 13 and to the server 1 of the service provider. Such a context management server may also comprise a RAM and storage components such as a non-volatile rewrite memory (flash memory or EEPROM memory) able to store a database and processing components comprising a processor. The server may also comprise interface components of wire type such as an Ethernet link or of wireless type such as a Wi-Fi or Bluetooth connection enabling it to connect to the communication module 3 or to the parameterizing device 13 and to the server 1 of the service provider.

According to one particular embodiment, the context management server 12 is integrated in the server of the service provider.

As illustrated in FIG. 2, for parameterizing of the communication service delivered by the server of the service provider to the communication module, the communication service being configured in accordance with availability status, the following processes are carried out by the parameterizing device 13:

detecting E0 a change in context of use of a portable device of the user;

determining E1 a new availability status of said user as a function of detected change in context of use of the portable device;

transmitting E2 a message relating to the new availability status of said user to the server 1 of the service provider or the communication module so that the communication service is configured on the basis of the determined new availability status.

A process E3 to feed information back to said user via said user interface 7 of the portable device on the new availability status can also be carried out.

The portable device therefore allows users at any time to be maintained aware of their availability status and allows modification of this status if it is not the status desired by users.

According to one particular embodiment, the parameterizing method is implemented by the user's terminal 11 which then comprises the communication module 3 and the parameterizing device 13.

Prior to performing process E0, the portable device modifies its context of use further to a manual command by the user for example, or further to an automatic command such as explained below (process E011 or E012).

A change in context of use of the portable device corresponds for example to a change in the display mode of the information fed back by the portable device. For example, if the portable device is a watch, the display mode of the time and other data can be modified so as to adapt the displayed data to the activities of the user (meeting, work, sport), . . . .

Subsequent to the change in context of use of the portable device, the portable device transmits a message to the communication module of the terminal 11 containing information on said change.

In one embodiment of the parameterizing method, the detection E0 of a change in context of use of the user's portable device is carried out via receipt by the communication module of the terminal 11 of the message transmitted by the portable device and containing information indicating the change in context of use of the portable device.

According to this particular embodiment, at process E1 the parameterizing device of the terminal 11 then determines a new availability status based on the detected change in context of use of the portable device. Such a determination is obtained for example from a set of availability statuses the parameters of which are stored in a memory of the terminal 11, each availability status being associated with a context of use of the portable device. For each functionality of the communication service such as voice or video calls, text messages, vocal messages or video, the parameters of an availability status indicate whether or not the functionality is authorized in the context of use of the portable device.

At process E2, the parameterizing device 13 of the terminal 11 transmits a message to the server 1 containing information on the new availability status determined at process E1.

According to another particular embodiment, the parameterizing device 13 is included in the portable device 6 and the parameterizing method is implemented by the user's portable device 6.

In a first variant of this particular embodiment, the process to detect a change in context of use E0 can be carried out at the time of modification of the display mode of the information fed back by the portable device e.g. manually by the user on the portable device. To do so the user can press on the button 10 of the portable device 6 for example. The portable device then receives a manual command from said user at receiving process E011. The portable device may comprise several buttons, each one associated with a particular context of use. The user is therefore able to indicate a change in context of use to the portable device in relation to the change in user activities e.g. by a simple, single push on the suitable button. Alternatively, a list of contexts of use can be associated with one button of the portable device. In this case the user with one or more successive pushes on this button is able to scroll down this list and select a new context of use of the portable device.

In a second variant of this particular embodiment, the process E0 to detect a change in context of use is automatically carried out. For this purpose the portable device automatically detects the user's context at a detection process E012 and accordingly selects an adapted context of use.

Such an automatic detection may comprise a process E0121 to locate said portable device 6. In this case the portable object may comprise a geolocation module. Such a geolocation may be performed in absolute manner e.g. using a GPS receiver, or in relative manner in relation to access points of a wireless network such as a telephone or Wi-Fi network. The user's context can then automatically be determined in relation to the user location. For example, a work context can be detected when the user is located at his/her office or company address, while a home context can be detected if the user is located at home.

Such an automatic detection of user's context may also comprise the detection of a communication device in the environment of said user E0122. For example, the portable device can detect an access point of a network of Wi-Fi type associated with the home or office, a connected item of equipment such as a car radio in the user's vehicle or an RFID tag affixed to an object such as a bicycle to detect a change in user's context. For example, if the portable device detects the RFID tag of the user's bicycle for a certain time it is possible reasonably to assume that the user has started cycling and to determine a new user's context of sport-related type.

Further to detection of a change in context of use of the portable device, at process E1, the parameterizing device of the portable device determines a new availability status as a function of the detected change in context of use. Such a determination is performed for example on the basis of a set of availability statuses the parameters of which are stored in a memory of the portable device or of the terminal 11. Each availability status is associated with a context of use of the portable device. For each functionality of the communication service such as voice or video calls, text messages, vocal messages or video, the parameters of an availability status indicate whether or not the functionality is authorized in the context of use of the portable device.

Further to automatic detection of change in context, at a confirmation process E014 the portable device can transmit a confirmation request of its change in availability status to the user so that the user is able to verify the new automatically selected status and to prevent automatic updating of the availability status on which the configuration service is configured if the user's context has been ill—determined by the portable device and a wrongly adapted new status has been selected. It is possible to make provision for automatic validation of this request after a predetermined time in the event of no user response.

When the parameterizing device 13 of the portable device has determined a change in availability status of the user at process E1, it transmits a message at a transmission process E2 relating to the new availability status of said user to the server 1 of the service provider or the communication module so that the communication service is configured in accordance with the new availability status.

In a first embodiment, the message relating to the new availability status can be transmitted by the parameterizing device 13 to the server 1 of the service provider 2 which will parameterize said service to be delivered to the communication module 3 in relation to the received new availability status. This transmission can be sent directly to the server 1 or else via the communication module 3.

In a second embodiment, the communication module 3 or the parameterizing device 13, and the server 1 of the service provider can be connected to a context management server 12. The parameterizing device can then transmit the message relating to the new availability status of said user to this context management server directly or via the communication module.

In a first variant of embodiment, the new availability status is then stored in the storage components of said context management server 12 and made available to the server of the service provider. The latter may periodically poll the context management server to have information on the availability status of the user.

In a second variant of embodiment, the context management server 12 can store parameterizing information associated with availability statuses and related to the service delivered to the communication module 3 of the user allowing the parameterizing of the communication module. The context management server on receiving a message relating to the new availability status of the user, can then transmit the parameterizing information associated with this new availability status to the server of the service provider so that the latter can parameterize said service as a function of the new availability status.

The server 1 of the service provider 2, on the basis of the new availability status or of the associated parameterizing information, can parameterize the communication service delivered to the communication module 3. For example, if the new availability status indicates that the receiving of calls is no longer authorized, the server 1 of the service provider modifies the logics of the communication service via a configuration of the servers of the communication network core (not illustrated) to block the transmission of incoming calls to the communication module, and/or to activate call forwarding to a voice box or another terminal. If the communication service enables each user to be informed of the availability status of the other users of the service, for example for a chat or social network messaging, the server of the service provider can indicate to the other users the new availability status of the user.

At a feedback process E3, the portable device 6 can feed back information to the user 4 via said user interface 7 relating to his/her new availability status.

Such feedback information may be visual information such as the display of a pictogram, or audio such as a ring or vocal message associated with the new selected availability status, or a vibration.

When said user interface 7 of the portable device 6 displays interface elements corresponding to a set of functionalities to be displayed, the information feedback process E3 may comprise the selecting E31 of a set of functionalities to be displayed in relation to said new availability status of the user and the display E32 of interface elements corresponding to said selected set of functionalities. For example, the portable device, in a work context, may display the time and the next appointment noted in the user's agenda. In a sports context, the portable device may display a chronometer, altimeter or future weather indication. The selection of a new availability status associated with a certain context may then trigger adapting of the information displayed on the portable device so that they correspond to the new user's context without the user manually having to configure the functionalities to be displayed. In addition, said automatic adapting of the displayed functionalities increases the probability that users will realize that their current availability status is no longer adapted to their current context. Returning to the preceding example, if the portable device displays the altitude of the user whereas the user is at the office, the user will immediately perceive that the selected context of use of the portable device is not correct and hence that the associated availability status for the communication service delivered to the communication module is not correct.

Additionally, the parameterizing device 13, further to determination of a new availability status can parameterize said portable device 6 of said communication module 3 in relation to the new availability status of the user at a parameterizing process E4. The parameterizing device, on determining that the user is entering a cinema, may for example change the user's mobile telephone comprising the communication module over to silent mode to prevent any disturbance such as a sound signal for a notification such as an agenda reminder.

Such a parameterizing method therefore enables users easily to update their availability status and permanently to have knowledge of their current status so that it can be modified as soon as necessary to keep it up to date. The communication services provided to the user can therefore be correctly parameterized at all times so that they can be adapted to user's context.

The invention claimed is:

1. A method to parameterize a communication service delivered by a server of a service provider to a communication module of a user, the communication service being configured in accordance with an availability status, the method comprising:

detecting a change in context of use of a portable device by the user separate from a change in context of use of the communication module, wherein detecting the change in context of use of the portable device is made by detecting a change of the display mode of the information fed back by the portable device and comprises receiving, by the communication module, a message from the portable device containing information indicating a change in context of use of the portable device;

determining a new availability status as a function of the detected change in context of use; and transmitting a message relating to the new availability status to the server of the service provider or the communication module so that the communication service is configured on the basis of the determined new availability status;

parameterizing the portable device or the communication module in relation to the new availability status of the user; and feeding information back to the user via a user interface of the portable device relating to the determined new availability status, wherein the user interface of the portable device displays interface elements corresponding to a set of functionalities to be displayed, the feedback of information on the user's new availability status comprises selecting the set of functionalities to be displayed as a function of the user's new availability status and displaying interface elements corresponding to the set of selected functionalities.

2. The method according to claim 1, wherein detection of the change in context of use of the portable device comprises automatic detection of the user's context.

3. The method according to claim 2, wherein automatic detection of the user's context comprises locating the portable device.

4. The method according to claim 1, wherein automatic detection of the user's context comprises detecting a communication device in the environment of the user.

5. The method according to claim 1, wherein the message relating to the new availability status of the user is transmitted to a context management server, the server of the service provider parameterizing the communication service via the context management server.

6. A non-transitory computer readable storage medium having stored thereon code instructions to implement a method according to claim 1 when the instructions are executed by a processor.

7. A device for parameterizing a communication service delivered by a server of a service provider to a communication module of a user, the communication service being configured in accordance with an availability status, the portable device or the communication module being parameterized in relation to the user's new availability status, the device comprising:

a data processor configured to:

detecting a change in context of use of a portable device of the user separate from a change in context of use of the communication module by detecting a change of the display mode of the information fed back by the portable device;

receiving, by the communication module, a message from the portable device containing information indicating the change in context of use of the portable device;

determining a new availability status of a user as a function of the detected change in context of use;

an interface capable of transmitting a message relating to the new availability status of the user to the server of the service provider or the communication module, so that the communication service is configured on the basis of the determined new availability status of the user; and a portable device user interface capable of feeding information back to the user relating to the determined new availability status, wherein the portable device user interface displays interface elements corresponding to a set of functionalities to be displayed, the feedback of information on the user's new availability status comprises selecting the set of functionalities to be displayed as a function of the user's new availability status and displaying interface elements corresponding to the set of selected functionalities.

8. A portable device comprising a parameterizing device according to claim 7 and comprising a user interface to feed information back to the user relating to the new availability status.

9. A terminal comprising a parameterizing device according to claim 7 and the communication module.

10. A parameterizing system of a communication service comprising a portable device according to claim 8, a communication module and a server of a service provider.

11. The method according to claim 1, wherein parameterizing the portable device or the communication module includes blocking a transmission of incoming calls or messages, or activating call forwarding to a voice box or an external mobile communication device.

12. The method according to claim 1, wherein parameterizing the portable device or the communication module includes configuring the communication module into a silent mode.

13. A device for parameterizing a communication service delivered by a server of a service provider to a communication module of a user, the communication service being configured in accordance with an availability status, the device comprising:

a data processor configured to:
  detecting a change in context of use of a portable device by the user separate from a change in context of use of the communication module by detecting a change of the display mode of the information fed back by the portable device;
  receiving, by the communication module, a message from the portable device containing information indicating the change in context of use of the portable device;
  determining a new availability status as a function of the detected change in context of use;
  transmitting a message relating to the new availability status of the user to the server of the service provider or the communication module so that the communication service is configured on the basis of the determined new availability status of the user; and
  parameterizing the portable device or the communication module in relation to the new availability status of the user; and
  feeding information back to the user via a user interface of the portable device relating to the determined new availability status, wherein the user interface of the portable device displays interface elements corresponding to a set of functionalities to be displayed, the feedback of information on the user's new availability status comprises selecting a set of functionalities to be displayed as a function of the user's new in interface elements corresponding to the set of selected functionalities.

14. The device according to claim 13, wherein parameterizing the portable device or the communication module includes blocking a transmission of incoming calls or messages, or activating call forwarding to a voice box or an external mobile communication device.

15. The device according to claim 13, wherein parameterizing the portable device or the communication module includes configuring the communication module into a silent mode.

* * * * *